United States Patent
Kono et al.

(10) Patent No.: US 6,214,492 B1
(45) Date of Patent: Apr. 10, 2001

(54) HYDROGEN-ABSORBING ALLOY, ELECTRODE AND SECONDARY BATTERY

(75) Inventors: Tatsuoki Kono, Tokyo; Isao Sakai, Yokohama; Hideki Yoshida, Yokohama; Takamichi Inaba, Yokohama; Masaaki Yamamoto, Inzai; Shiro Takeno, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/270,765

(22) Filed: Mar. 17, 1999

(30) Foreign Application Priority Data

Mar. 19, 1998 (JP) .................................................. 10-070564
Jun. 17, 1998 (JP) .................................................. 10-170326

(51) Int. Cl.⁷ .............................. H01M 4/38; C01B 6/24
(52) U.S. Cl. ........................ 429/218.2; 429/53; 420/900
(58) Field of Search ................ 429/218.2, 59, 429/223; 420/900

(56) References Cited

U.S. PATENT DOCUMENTS

| | | | |
|---|---|---|---|
| 4,126,242 | * | 11/1978 | Yajima et al. . |
| 5,962,165 | * | 10/1999 | Tsuruta et al. . |
| 5,964,968 | * | 10/1999 | Kaneko . |
| 5,968,291 | * | 10/1999 | Iba et al. . |
| 6,066,415 | * | 5/2000 | Sakai et al. . |

FOREIGN PATENT DOCUMENTS

| | | |
|---|---|---|
| 7-56803 | 6/1995 | (JP) . |
| WO97/03213 | 1/1997 | (JP) . |
| 10-1731 | 1/1998 | (JP) . |

* cited by examiner

Primary Examiner—Clifford C. Shaw
Assistant Examiner—Jonathan Johnson
(74) Attorney, Agent, or Firm—Oblon, Spivak, McClelland, Maier & Neustadt, P.C.

(57) ABSTRACT

There is provided a hydrogen-absorbing alloy comprising at least one crystal phase consisting essentially of at least one unit cell which has a laminate structure comprising at least one $A_2B_4$ subcell and at least one $AB_5$ subcell, and the aforementioned at least one unit cell satisfying the following formula (1), $$0.5 < X < 1 \quad (1)$$

wherein A is at least one kind of element which is capable of generating heat of formation $\Delta H$ (kJ/mol) of less than 20 kJ/mol at the occasion of generating a hydride from one mole of hydrogen at a temperature of 25° C., B is at least one kind of element which is capable of generating heat of formation $\Delta H$ (kJ/mol) of not less than 20 kJ/mol at the occasion of generating a hydride from one mole of hydrogen at a temperature of 25° C., and X is a ratio in number of the aforementioned at least one $A_2B_4$ subcell to the aforementioned at least one $AB_5$ subcell.

35 Claims, 4 Drawing Sheets

HYDROGEN-ABSORBING ALLOY, ELECTRODE AND SECONDARY BATTERY

BACKGROUND OF THE INVENTION

This invention relates to a hydrogen-absorbing alloy, to an electrode containing the hydrogen-absorbing alloy, and to a secondary battery comprising a negative electrode comprising the hydrogen-absorbing alloy.

Since hydrogen-absorbing alloy is capable of safely and easily storing hydrogen as an energy source, hydrogen-absorbing alloy is now attracting many attentions as a new energy exchange material or a new energy storage material. Thus, there have been proposed various applications of hydrogen-absorbing alloy as a new functional raw material, such as the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, and a temperature sensor.

Recently, a nickel-hydrogen secondary battery where a hydrogen-absorbing alloy is employed as a negative electrode material has been attracting many attentions as a public-use battery of next generation, because the battery is advantageous in various aspects, e.g. it is high in capacity, highly resistive to overcharging and overdischarging, capable of performing a high rate charge/discharge, free from environmental pollution, and interchangeable with a nickel-cadmium battery. Accordingly, many attempts have been intensively made at present for the application and actual use of the nickel-hydrogen battery.

As evident from these facts, the hydrogen-absorbing alloy has many possibilities for various applications in view of its useful physical and chemical characteristics, so that the hydrogen-absorbing alloy is now considered as being one of important raw materials in future industries.

The metal capable of absorbing hydrogen may be a metal element which reacts exothermically with hydrogen, i.e. which is capable of forming a stable compound together with hydrogen (for example, Pd, Ti, Zr, V, a rare earth element or an alkaline earth element); or an alloy comprising an above-mentioned metal element.

One of the advantages of employing an alloy is that the bonding strength between a metal and hydrogen can be suitably weakened so that not only the absorption reaction but also the desorption reaction can be performed comparatively easily. Second advantage of employing an alloy is that the absorption and desorption characteristics of the alloy such as the magnitude of hydrogen gas pressure required for the reaction (equilibrium pressure; plateau pressure), the extent of equilibrium region (plateau region), or the change of equilibrium pressure during the process of absorbing hydrogen (flatness), etc. can be improved. Third advantage of employing an alloy is the improvement in chemical and physical stability of the metal capable of absorbing hydrogen.

The composition of the conventional hydrogen-absorbing alloy may be classified into the following types;

(1) a rare earth element type (for example, $LaNi_5$, $MmNi_5$, etc.);

(2) a Laves type (for example, $ZrV_2$, $ZrMn_2$, etc.);

(3) a titanium type (for example, TiNi, TiFe, etc.);

(4) a magnesium type (for example, $Mg_2Ni$, $MgNi_2$, etc.); and (5) other types (for example, cluster, etc.).

By the way, the rare earth element-Ni based intermetallic compound represented by the aforementioned type (1) includes many number of compounds other than an $AB_5$ type compound. For example, Mat. Res. Bull., 11, (1976) 1241 describes that an intermetallic compound containing a larger quantity of rare earth element as compared with the $AB_5$ type compound is capable of absorbing a larger quantity of hydrogen in the vicinity of normal temperature as compared with the $AB_5$ type compound. It is also reported that a magnesium-rare earth element based alloy, which is a magnesium-substituted rare earth-Ni based alloy, is capable of absorbing a large quantity of hydrogen gas (Y. Ohsumi, "Soda and Chlorine", 34, 447 (1983)).

It is pointed out by H. Oesterreicher et al in J. Lee-Common Met, 73,339 (1980) that $La_{1-x}Mg_xNi_2$ type alloys for example among the alloys having such compositions are accompanied with a problem that the hydrogen-releasing rate thereof is very low due to the high stability thereof to hydrogen.

There is also a report on a $PuNi_3$ type hydrogen-absorbing alloy having a composition of $Mg_2LaNig$, which was published by K. Kadir et al in the summary of lecture in the 120th Spring Meeting of Japan Metallic Society, p. 289 (1997).

BRIEF SUMMARY OF THE INVENTION

Accordingly, an object of the present invention is to provide a hydrogen-absorbing alloy which is excellent in hydrogen absorption/desorption property.

A further object of this invention is to provide an electrode comprising a hydrogen-absorbing alloy excellent in hydrogen absorption/desorption property and exhibiting a large discharge capacity even at low temperatures.

A further object of this invention is to provide a secondary battery which comprises a negative electrode comprising a hydrogen-absorbing alloy which is excellent in hydrogen absorption/desorption property, is capable of exhibiting a large discharge capacity even at low temperatures, and is long in charge/discharge cycle life.

Namely, according to the present invention, there is provided a hydrogen-absorbing alloy comprising at least one crystal phase consisting essentially of at least one unit cell which has a laminate structure comprising at least one $A_2B_4$ subcell and at least one $AB_5$ subcell, and the aforementioned at least one unit cell satisfying the following formula (1);

$$0.5 < X < 1 \qquad (1)$$

wherein A is at least one kind of element which is capable of generating heat of formation $\Delta H$ (kJ/mol) of less than 20 kJ/mol at the occasion of generating a hydride from one mole of hydrogen at a temperature of 25° C.; B is at least one kind of element which is capable of generating heat of formation $\Delta H$ (kJ/mol) of not less than 20 kJ/mol at the occasion of generating a hydride from one mole of hydrogen at a temperature of 25° C.; and X is a ratio in number of the aforementioned at least one $A_2B_4$ subcell to the aforementioned at least one $AB_5$ subcell.

According to the present invention, there is further provided an electrode comprising a hydrogen-absorbing alloy comprising at least one crystal phase consisting essentially of at least one unit cell which has a laminate structure comprising at least one $A_2B_4$ subcell and at least one $AB_5$ subcell, and the aforementioned at least one unit cell satisfying the following formula (1);

$$0.5 < X < 1 \qquad (1)$$

wherein A is at least one kind of element which is capable of generating heat of formation ΔH (kJ/mol) of less than 20 kJ/mol at the occasion of generating a hydride from one mole of hydrogen at a temperature of 25° C.; B is at least one kind of element which is capable of generating heat of formation ΔH (kJ/mol) of not less than 20 kJ/mol at the occasion of generating a hydride from one mole of hydrogen at a temperature of 25° C.; and X is a ratio in number of the aforementioned at least one $A_2B_4$ subcell to the aforementioned at least one $AB_5$ subcell.

According to the present invention, there is further provided a secondary battery which comprises a negative electrode comprising a hydrogen-absorbing alloy comprising at least one crystal phase consisting essentially of at least one unit cell which has a laminate structure comprising at least one $A_2B_4$ subcell and at least one $AB_5$ subcell, and the aforementioned at least one unit cell satisfying the following formula (1);

$$0.5 < X < 1 \qquad (1)$$

wherein A is at least one kind of element which is capable of generating heat of formation ΔH (kJ/mol) of less than 20 kJ/mol at the occasion of generating a hydride from one mole of hydrogen at a temperature of 25° C.; B is at least one kind of element which is capable of generating heat of formation ΔH (kJ/mol) of not less than 20 kJ/mol at the occasion of generating a hydride from one mole of hydrogen at a temperature of 25° C.; and X is a ratio in number of the aforementioned at least one $A_2B_4$ subcell to the aforementioned at least one $AB_5$ subcell.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

This hydrogen-absorbing alloy comprises at least one crystal phase consisting essentially of at least one unit cell which has a laminate structure comprising at least one $A_2B_4$ subcell and at least one $AB_5$ subcell, and the aforementioned at least one unit cell satisfying the following formula (1);

$$0.5 < X < 1 \qquad (1)$$

wherein A is at least one kind of element which is capable of generating heat of formation ΔH (kJ/mol) of less than 20 kJ/mol at the occasion of generating a hydride from one mole of hydrogen at a temperature of 25° C.; B is at least one kind of element which is capable of generating heat of formation ΔH (kJ/mol) of not less than 20 kJ/mol at the occasion of generating a hydride from one mole of hydrogen at a temperature of 25° C.; and X is a ratio in number of the aforementioned at least one $A_2B_4$ subcell to the aforementioned at least one $AB_5$ subcell.

The subcell herein means a unit structure constituting the unit cell.

Although the $A_2B_4$ subcell includes various structures, the Laves structure is most preferable among them. Preferable examples of the Laves structure are $MgZn_2$(C14) type structure, $MgCu_2$(C15) type structure and $MgNi_2$(C36) type structure.

Preferable examples of the $AB_5$ subcell are those having a $CaCu_5$ type structure, wherein $LaNi_5$ type structure is most preferable among them. A unit cell where the $AB_5$ subcell is constituted by the $CaCu_5$ type structure is capable of minimizing a deformation between subcells. In particular, a hydrogen-absorbing alloy comprising a crystal phase which is formed of a unit cell where the $AB_5$ subcell is constituted by the $CaCu_5$ type structure and the $A_2B_4$ subcell is constituted by the Laves structure is capable of prominently improving the hydrogen-absorbing property thereof.

The aforementioned at least one unit cell may take various structures. Among them, a unit cell which can be represented by a structure of "n(LCLCC)", where L denotes the $A_2B_4$ subcell, C denotes the $AB_5$ subcell and n is a natural number, is preferable. When n is 2 or more however, the unit cell takes a laminated structure consisted of 2 or more (LCLCC) units, where the C positioned at the lowermost layer of one of these units is contacted with the L positioned at the uppermost layer of another one of these units. A hydrogen-absorbing alloy comprising at least one crystal phase consisting essentially of at least one unit cell having a structure represented by n(LCLCC) is capable of prominently improving the hydrogen-absorbing property thereof. In particular, when n is selected to be 1 or 2 in the structure of n(LCLCC), the resultant electrode and secondary battery would exhibit a prominent improvement in discharge property thereof. Further, the substitution of a different kind of element for an element in each subcell, or the alteration of atomic sequence in each subcell would give rise to a tendency to improve the hydrogen absorption property even if the pattern of (LCLCC) is increased further.

Next, the reason for limiting the ratio X in number of the aforementioned at least one $A_2B_4$ subcell to the aforementioned at least one $AB_5$ subcell will be explained. If this ratio is 0.5 or less, it may become difficult not only to improve the hydrogen absorption/desorption property of the hydrogen-absorbing alloy, but also to improve the discharge property, in particular at low temperatures, of the electrode containing such a hydrogen-absorbing alloy, and of the secondary battery comprising such an electrode. By the way, more preferable range of this ratio X is 0.55≦X≦0.85.

Figure 1:
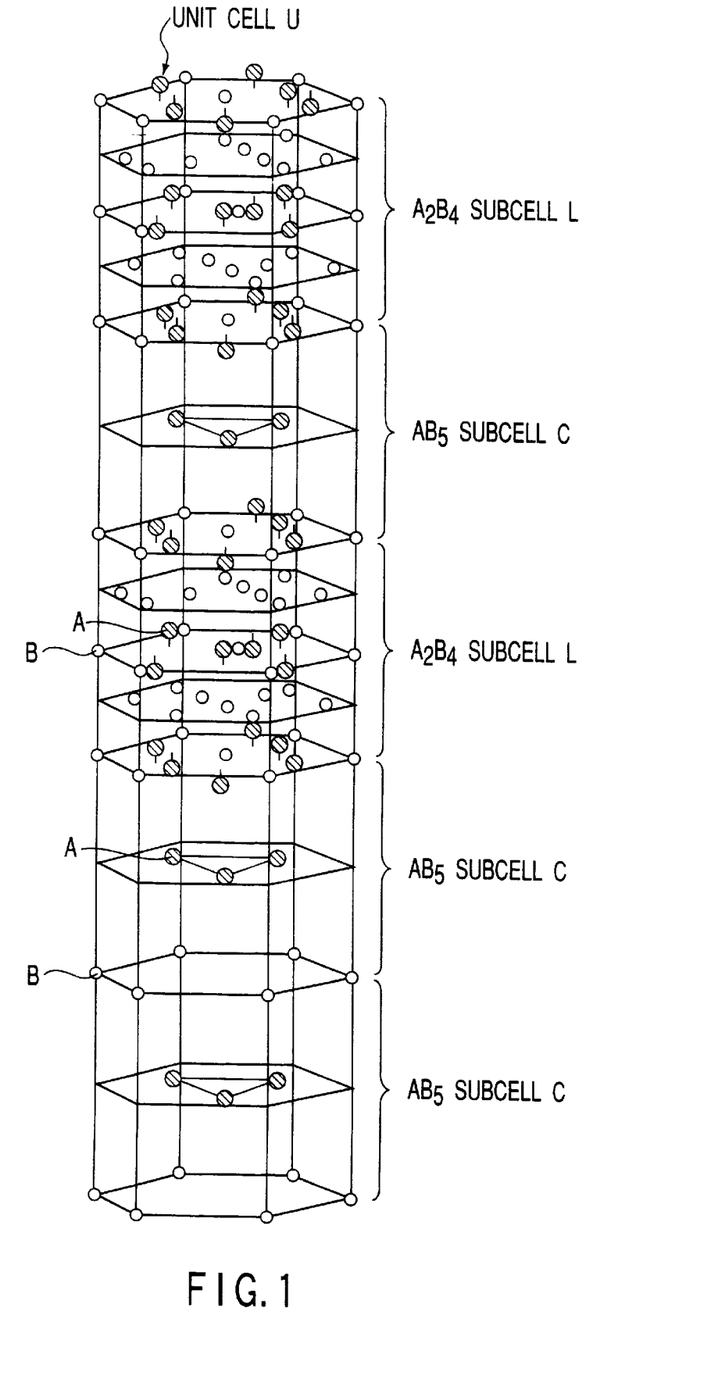
FIG. 1 is a model schematically illustrating a unit cell of a hydrogen-absorbing alloy according to this invention.

The unit cell having a structure represented by (LCLCC) representing one example of the aforementioned unit cell will be explained with reference to FIG. 1. As shown in FIG. 1, the $A_2B_4$ subcell L is formed of an $MgZn_2$ type structure for instance, while the $AB_5$ subcell C is formed for example of an $LaNi_5$ type structure, i.e. a closest-packed hexagonal lattice structure. This unit cell U is formed of a couple of the $A_2B_4$ subcell L and three of the $AB_5$ subcell C, which are laminated in the order of L, C, L, C and C. In this unit cell U, the atom B existing at the boundary between neighboring subcells is shared by these neighboring subcells.

The element A is at least one kind of element which is capable of generating heat of formation ΔH (kJ/mol) of less than 20 kJ/mol at the occasion of generating a hydride from one mole of hydrogen at a temperature of 25° C.

Various kinds of element can be employed as this element A depending on a specific purpose of utilization. For example, if it is desired to increase the quantity of hydrogen absorption, it is preferable to employ, as this element A, an element which is capable of spontaneously forming a hydride. Specifically, the element A may be at least one kind of element selected from the group consisting of rare earth elements including Y, Ca, Sr, Mg, Sc, Ti, Zr, V, Nb, Hf and Ta. Among them, the element A comprising Mg and a rare earth element is preferably employed. In view of saving the manufacturing cost, the employment of a misch metal as a rare earth element is preferable. This misch metal is a mixture of rare earth elements containing a light rare earth element. Specific examples of such a misch metal are a Ce-rich misch metal (Mm) where the content of La, Ce, Pr and Nd accounts for 99 wt % or more with the content of Ce being 50 wt % or more and the content of La being not more than 30 wt %, and a La-rich misch metal (Lm) where the content of La is larger than that of the aforementioned Mm.

The element B is at least one kind of element which is capable of generating heat of formation ΔH (kJ/mol) of not less than 20 kJ/mol at the occasion of generating a hydride from one mole of hydrogen at a temperature of 25° C. Various kinds of element can be employed as this element B depending on a specific purpose of utilization. For example, if it is desired to facilitate the desorption of hydrogen which is once absorbed in a hydrogen-absorbing alloy, it is preferable to employ, as this element B, an element which is hardly capable of spontaneously forming a hydride. Specifically, the element B may be at least one kind of element selected from the group consisting of Ni, Cr, Mn, Fe, Co, Cu, Zn, Sn, Si, B, Al and Ga. Among them, the element B comprising Ni is preferably employed. More preferable examples of the element B is those that contains Ni and at the same time, Ni is substituted by Co, Mn or both Co and Mn. An electrode comprising a hydrogen-absorbing alloy where the element B contains Ni and Ni is substituted by Co, Mn or both Co and Mn enables a low temperature discharge property to be improved. In particular, when a portion of Ni is substituted by Co in this hydrogen-absorbing alloy, the charge/discharge cycle property of the secondary battery at low temperatures can be remarkably improved.

The aforementioned hydrogen-absorbing alloy should preferably include the aforementioned at least one crystal phase at a ratio of 0.3 or more as measured by means of a transmission type electron microscope (TEM). Because if this ratio thus measured is less than 0.3, it may become difficult to improve the hydrogen absorption/desorption property of the hydrogen-absorbing alloy, as well as to improve the charge/discharge performance at low temperatures of an electrode and of a secondary battery. A more preferable measured ratio of this crystal phase is 0.4 or more. The ratio of this crystal phase can be measured by the method as explained below. Namely, an ingot of hydrogen-absorbing alloy is cut in any desired direction thereby to obtain a first sample. On the other hand, a second sample is prepared by cutting the ingot of hydrogen-absorbing alloy in perpendicular to the cut surface of the first sample. Then, the same number of these two kinds of samples are arbitrarily picked up and then subjected to the measurement regarding the electron diffraction image as well as the lattice image by means of a transmission type electron microscope (TEM). Thereafter, the ratio of points where the aforementioned unit cell is recognized to the total measured points is measured, thereby determining the ratio of this crystal phase.

Although this hydrogen-absorbing alloy may consist essentially of at least one crystal phase consisting essentially of at least one unit cell which has a laminate structure comprising at least one $A_2B_4$ subcell and at least one $AB_5$ subcell and the aforementioned at least one unit cell satisfying the aforementioned formula (1), other crystal phases having different crystal structures or an amorphous phase may also be included in the hydrogen-absorbing alloy. Examples of aforementioned other crystal phases are for instance a phase having $AB_2$ type crystal structure, a phase having $AB_3$ type crystal structure, a phase having $AB_5$ type crystal structure and a phase having $AB_{3.5}$ type crystal structure. Examples of the phase having $AB_2$ type crystal structure are a phase having an $MgCu_2$ type crystal structure. Examples of the phase having $AB_3$ type crystal structure are a phase having a $CeNi_3$ type crystal structure and a phase having a $PuNi_3$ type crystal structure. Examples of the phase having $AB_5$ type crystal structure are a phase having a $CaCu_5$ type crystal structure. Examples of the phase having $AB_{3.5}$ type crystal structure are a phase having a $A_2B_7$ type crystal structure. Examples of the phase having $A_2B_7$ type crystal structure are a phase having a $Ce_2Ni_7$ type crystal structure and a phase having a $Gd_2Co_7$ type crystal structure. In particular, it is more preferable to employ an alloy consisting essentially of at least one crystal phase consisting essentially of the aforementioned at least one unit cell.

A hydrogen-absorbing alloy comprising at least one crystal phase consisting essentially of the aforementioned at least one unit cell, and at least one kind of crystal phase selected from the group consisting of a phase having $AB_2$ type crystal structure, a phase having $AB_3$ type crystal structure, a phase having $AB_{3.5}$ type crystal structure and a phase having $AB_5$ type crystal structure is capable of improving the hydrogen absorption/desorption rate and erosion resistance. Further, an electrode comprising the aforementioned hydrogen-absorbing alloy as well as a secondary battery comprising such an electrode is capable of improving the low temperature discharge property and charge/discharge cycle life thereof. There is a tendency that these features are more enhanced in the order of an $AB_{3.5}$ type crystal phase, an $AB_3$ type crystal phase, an $AB_5$ type crystal phase and an $AB_2$ type crystal phase. That is, it is most preferable to employ an alloy comprising an $AB_{3.5}$ type crystal phase.

Figure 2:
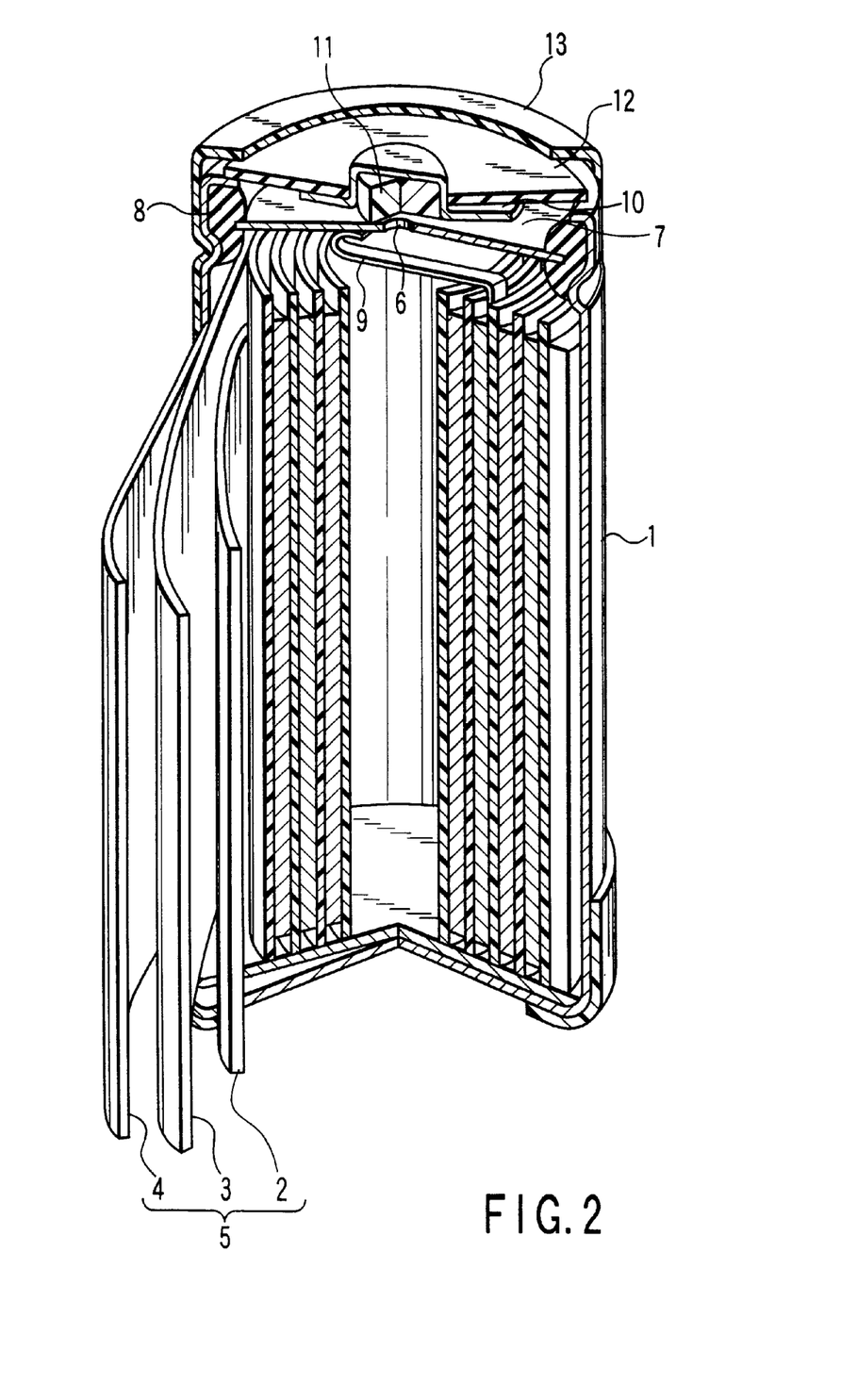
FIG. 2 is a partially sectioned perspective view showing a cylindrical metal oxide-hydrogen secondary battery representing one embodiment of a secondary battery of this invention.

This invention will be explained further with reference to FIG. 2 showing a metal oxide-hydrogen secondary battery (a cylindrical metal oxide-hydrogen secondary battery) embodying one example of a secondary battery of this invention.

Referring to FIG. 2, a bottomed cylindrical case 1 is accommodated therein with an electrode group 5 which has been manufactured by stacking a positive electrode 2, a separator 3 and a negative electrode 4, and then by spirally winding the stacked body. The negative electrode 4 is disposed at the outermost periphery of the electrode group 5 so as to electrically contact with the cylindrical case 1. The cylindrical case 1 contains an alkaline electrolyte. A sealing plate 7 formed of a disk having an opening 6 at the center is disposed on the upper opening of the cylindrical case 1. An insulating gasket 8 having a ring-like shape is interposed between the periphery of the sealing plate 7 and the upper inner wall surface of the opening of the cylindrical case 1. The peripheral fringe portion of the opening of the cylindrical case 1 is caulked inward so that the sealing plate 7 is hermetically fixed via the gasket 8 to cylindrical case 1. The positive electrode lead 9 is connected through its one end to the positive electrode 2 and through its other end to the lower surface of the sealing plate 7. A positive electrode terminal 10 having a hat-like shape is mounted over the sealing plate 7 in such a manner as to cover the opening 6. A rubber safety valve 11 is disposed in a space surrounded by the sealing plate 7 and the positive electrode terminal 10 in such a manner as to seal the opening 6. A holding plate 12 formed of an insulating disk having an opening at the center is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The positive electrode 2

This positive electrode 2 may be of any structure as long as it is capable of stably charging and discharging in an electrolyte, and can be manufactured by a method wherein a conductive material is added to an active material, i.e. nickel hydroxide powder, and the resultant mixture is kneaded together with a binder and water to prepare a paste, which is then stuffed into an electroconductive substrate and, after being dried, pressed.

The nickel hydroxide powder should preferably contain a mixture comprising nickel hydroxide and at least one kind of compound selected from the group consisting of zinc oxide, cobalt oxide, zinc hydroxide and cobalt hydroxide. A nickel-hydrogen secondary battery which comprises a positive electrode comprising the aforementioned nickel hydroxide powder and a negative electrode containing a hydrogen-absorbing alloy of this invention is capable of greatly improving the charge/discharge capacity and low temperature discharge property thereof.

As for the conductive material, cobalt oxide, cobalt hydroxide, metallic cobalt, metallic nickel and carbon can be used.

Examples of binder are carboxymethyl cellulose, methyl cellulose, sodium polyacrylate, polytetrafluoroethylene and polyvinyl alcohol (PVA).

The electroconductive substrate may be formed of a mesh-shaped, sponge-shaped or felt-shaped metallic porous body or of a substrate consisting of metal fibers. Examples of metal are nickel, stainless steel or a nickel-plated metal.

(2) The negative electrode 4

This negative electrode 4 is formed of a hydrogen-absorbing alloy comprising at least one crystal phase consisting essentially of at least one unit cell which has a laminate structure comprising at least one $A_2B_4$ subcell and at least one $AB_5$ subcell, and the aforementioned at least one unit cell satisfying the aforementioned formula (1).

This negative electrode 4 can be manufactured by the following methods (1) and (2).

(1) A conductive material is added at first to a hydrogen-absorbing alloy powder and then kneaded together with a binder and water to prepare a paste, which is then stuffed into an electroconductive substrate and, after being dried, pressed, thereby forming the negative electrode.

(2) A conductive material is added at first to a hydrogen-absorbing alloy powder and then kneaded together with a binder to prepare a mixed material, which is then sustained on an electroconductive substrate and, after being dried, pressed, thereby forming the negative electrode.

As for the pulverizing method of the hydrogen-absorbing alloy, a mechanical pulverizing method such as a ball mill, a pulverizer, a jet mill, etc. or a method of allowing a high pressure hydrogen to be absorbed in and desorbed from the alloy so as to cause a voluminal expansion of the alloy and hence to pulverize the alloy may be employed.

As for the binder, the same materials as employed for the positive electrode 2 can be used. By the way, if this negative electrode is to be manufactured by making use of the aforementioned item (2), it is preferable to employ a binder containing polytetrafluoroethylene (PTFE).

As for the conductive material, carbon black for example can be used.

The electroconductive substrate may be formed from a two-dimensional substrate such as a punched metal, an expanded metal and a nickel net; or a three-dimensional substrate such as a felt-shaped metallic porous body or a sponge-shaped metallic substrate.

(3) The separator 3

The separator 3 may be formed of a nonwoven fabric such as a polypropylene nonwoven fabric, a nylon nonwoven fabric or a nonwoven fabric comprising polypropylene fiber and nylon fiber. In particular, a polypropylene nonwoven fabric treated to have a hydrophilic surface is preferable as a separator.

(4) Alkaline electrolyte

Examples of the alkaline electrolyte are an aqueous solution of sodium hydroxide (NaOH), an aqueous solution of lithium hydroxide (LiOH), an aqueous solution of potassium hydroxide (KOH), a mixed solution of sodium hydroxide (NaOH) and lithium hydroxide (LiOH), a mixed solution of potassium hydroxide (KOH) and lithium hydroxide (LiOH), and a mixed solution of NaOH, KOH and LiOH.

As explained above, the hydrogen-absorbing alloy according to this invention comprises at least one crystal phase consisting essentially of at least one unit cell which has a laminate structure comprising at least one $A_2B_4$ subcell and at least one $AB_5$ subcell, and the aforementioned at least one crystal phase satisfying the aforementioned formula (1). It is possible according to this hydrogen-absorbing alloy to realize an excellent hydrogen absorption/desorption property even at low temperatures. Further, an electrode containing the aforementioned hydrogen-absorbing alloy as well as a secondary battery which comprises the aforementioned electrode as a negative electrode exhibit a high discharge capacity and a long charge/discharge cycle life even under a low temperature environment.

When the aforementioned hydrogen-absorbing alloy is formulated such that the aforementioned at least one $A_2B_4$ subcell has a Laves structure, and the aforementioned at least one $AB_5$ subcell has a $CaCu_5$ type structure, the hydrogen absorption property of the alloy can be further enhanced. Therefore, an electrode containing such a hydrogen-absorbing alloy as well as a secondary battery which comprises such an electrode as a negative electrode would exhibit a higher discharge capacity even under a low temperature environment.

When the aforementioned hydrogen-absorbing alloy is formulated such that the aforementioned at least one unit cell has a laminate structure represented by n(LCLCC), the hydrogen absorption property of the alloy can be improved. Therefore, an electrode containing such a hydrogen-absorbing alloy as well as a secondary battery which comprises such an electrode as a negative electrode would exhibit a higher discharge capacity even under a low temperature environment.

When the aforementioned hydrogen-absorbing alloy is formulated such that the A is constituted so as to include Mg and at least one kind of element selected from rare earth elements including Y, while the B is constituted so as to include Ni, the hydrogen absorption/desorption capacity thereof can be improved. Therefore, an electrode containing such a hydrogen-absorbing alloy as well as a secondary battery which comprises such an electrode as a negative electrode would exhibit a higher discharge capacity and a longer charge/discharge cycle life.

When the aforementioned hydrogen-absorbing alloy is formulated such that the ratio of the aforementioned at least one crystal phase is 0.3 or more, the hydrogen absorption/desorption rate thereof can be further improved. Therefore, an electrode containing such a hydrogen-absorbing alloy as well as a secondary battery which comprises such an electrode as a negative electrode would exhibit an improved discharge capacity even under a low temperature environment.

When the aforementioned hydrogen-absorbing alloy is formulated such that it further includes at least one kind of crystal phase selected from the group consisting of a phase having $AB_2$ type crystal structure, a phase having $AB_3$ type crystal structure, a phase having $AB_{3.5}$ type crystal structure and a phase having $AB_5$ type crystal structure, it is possible to further improve the hydrogen absorption/desorption rate and erosion resistance. Therefore, an electrode containing such a hydrogen-absorbing alloy as well as a secondary battery which comprises such an electrode as a negative electrode would exhibit a higher discharge capacity and a longer charge/discharge cycle life even under a low temperature environment.

When the aforementioned hydrogen-absorbing alloy is formulated such that the aforementioned at least one $A_2B_4$ subcell has a Laves structure, the aforementioned at least one $AB_5$ subcell has a $CaCu_5$ type structure, and the aforementioned at least one unit cell has a laminate structure represented by n(LCLCC), the hydrogen absorption property of the alloy can be prominently enhanced. Therefore, an electrode containing such a hydrogen-absorbing alloy as well as a secondary battery which comprises such an electrode as a negative electrode would exhibit a prominently improved charge/discharge property even under a low temperature condition.

When the aforementioned hydrogen-absorbing alloy is formulated such that the A is constituted so as to include Mg and at least one kind of element selected from rare earth elements including Y, the B is constituted so as to include Ni, and the aforementioned at least one unit cell has a laminate structure represented by n(LCLCC), the hydrogen absorption property of the alloy can be prominently enhanced. Therefore, an electrode containing such a hydrogen-absorbing alloy as well as a secondary battery which comprises such an electrode as a negative electrode would exhibit a prominently improved charge/discharge property even under a low temperature condition.

Although this invention has been explained about a cylindrical metal oxide-hydrogen secondary battery with reference to FIG. 1, it is also possible according to this invention to apply it in the same manner to a rectangular metal oxide-hydrogen secondary battery, wherein a closed-end rectangular case is accommodated therein with an electrode group consisting of a laminated body comprising positive electrodes and negative electrodes which are alternately superimposed one upon another with a separator being interposed therebetween, and with an alkali electrolyte.

This invention will be further explained in detail with reference to the following preferred embodiments.

EXAMPLES 1–5 AND COMPARATIVE EXAMPLES 1–5

Mother alloys, i.e. an $LaNi_5$, an $LaNi_2$ and an $MgNi_2$ were weighed so as to formulate each element La, Mg and Ni to take the compositions as shown in Table 1 while taking the yield of these elements into consideration. Then, the resultant mixed alloys were melted in a high frequency furnace filled with an argon gas atmosphere, thereby preparing various kinds of alloy ingot. Each of these alloy ingots was respectively heat-treated for 5 hours at a temperature of 950° C. to obtain various kinds of hydrogen-absorbing alloy ingot having the compositions shown in Table 1. In the Table 1, Lm is 90 weight % of La, 2 weight % of Ce, 5 weight % of Pr and 3 weight % of Nd.

Then, the crystal structure of 10 kinds of hydrogen-absorbing alloy thus obtained was measured according to the following method. Namely, each ingot of hydrogen-absorbing alloy was cut in any desired direction thereby to obtain a first sample. On the other hand, a second sample was prepared by cutting the ingot of the same hydrogen-absorbing alloy in perpendicular to the cut surface of the first sample. Then, 10 pieces of the first sample as well as 10 pieces of the second sample were arbitrarily picked up from each kind of hydrogen-absorbing alloy, and then subjected to the measurement regarding the electron diffraction image as well as the lattice image thereof by means of the TEM.

As a result, it was confirmed that the hydrogen-absorbing alloy of Example 1 was constituted by a phase having $AB_{3.5}$ type crystal structure, a phase having $AB_3$ type crystal structure and a crystal phase consisting of unit cells, each unit cell having a laminate structure comprising two $A_2B_4$ subcells and three $AB_5$ subcells which were superimposed one after another in the order of "LCLCC", wherein L denotes the $A_2B_4$ subcell and C denotes the $AB_5$ subcell. In this case, the $AB_5$ subcell had an $LaNi_5$ type structure. On the other hand, the $A_2B_4$ subcell had a Laves structure. In this unit cell, atoms existing at the boundary between neighboring subcells are shared by these neighboring subcells. The ratio in number of the $A_2B_4$ subcell to the $AB_5$ subcell in each unit cell, i.e. the ratio X (L/C) was found as being 0.67.

Further, it was confirmed that the hydrogen-absorbing alloy of Example 2 was constituted by a phase having $AB_{3.5}$ type crystal structure and a crystal phase consisting of unit cells, each unit cell having a laminate structure comprising two $A_2B_4$ subcells and three $AB_5$ subcells which were superimposed one after another in the order of "LCLCC", wherein L denotes the $A_2B_4$ subcell and C denotes the $AB_5$ subcell. In this case, the $AB_5$ subcell had an $LaNi_5$ type structure. On the other hand, the $A_2B_4$ subcell had a Laves structure. In this unit cell, atoms existing at the boundary between neighboring subcells are shared by these neighboring subcells. The ratio in number of the $A_2B_4$ subcell to the $AB_5$ subcell in each unit cell, i.e. the ratio X (L/C) was found as being 0.67.

Further, it was confirmed that the hydrogen-absorbing alloy of Example 3 was constituted by a phase having $AB_3$ type crystal structure and a crystal phase consisting of unit cells, each unit cell having a laminate structure comprising two $A_2B_4$ subcells and three $AB_5$ subcells which were superimposed one after another in the order of "LCLCC", wherein L denotes the $A_2B_4$ subcell and C denotes the $AB_5$ subcell. In this case, the $AB_5$ subcell had an $LaNi_5$ type structure. On the other hand, the $A_2B_4$ subcell had a Laves structure. In this unit cell, atoms existing at the boundary between neighboring subcells are shared by these neighboring subcells. The ratio in number of the $A_2B_4$ subcell to the $AB_5$ subcell in each unit cell, i.e. the ratio X (L/C) was found as being 0.67.

Further, it was confirmed that the hydrogen-absorbing alloy of Example 4 was constituted by a phase having $AB_{3.5}$ type crystal structure, a phase having $AB_3$ type crystal structure and a crystal phase consisting of unit cells, each unit cell having a laminate structure comprising two $A_2B_4$ subcells and three $AB_5$ subcells which were superimposed one after another in the order of "LCLCC", wherein L denotes the $A_2B_4$ subcell and C denotes the $AB_5$ subcell. In this case, the $AB_5$ subcell had an $LaNi_5$ type structure. On the other hand, the $A_2B_4$ subcell had a Laves structure. In this unit cell, atoms existing at the boundary between neighboring subcells are shared by these neighboring subcells. The ratio in number of the $A_2B_4$ subcell to the $AB_5$ subcell in each unit cell, i.e. the ratio X (L/C) was found as being 0.67.

Further, it was confirmed that the hydrogen-absorbing alloy of Example 5 was constituted by a phase having $AB_5$ type crystal structure, a phase having $AB_2$ type crystal structure and a crystal phase consisting of unit cells, each unit cell having a laminate structure comprising two $A_2B_4$ subcells and three $AB_5$ subcells which were superimposed one after another in the order of "LCLCC", wherein L denotes the $A_2B_4$ subcell and C denotes the $AB_5$ subcell. In this case, the $AB_5$ subcell had an $LaNi_5$ type structure. On the other hand, the $A_2B_4$ subcell had a Laves structure. In this unit cell, atoms existing at a boundary between neighboring subcells are shared by these neighboring subcells. The ratio in number of the $A_2B_4$ subcell to the $AB_5$ subcell in each unit cell, i.e. the ratio X (L/C) was found as being 0.67.

Figure 3:
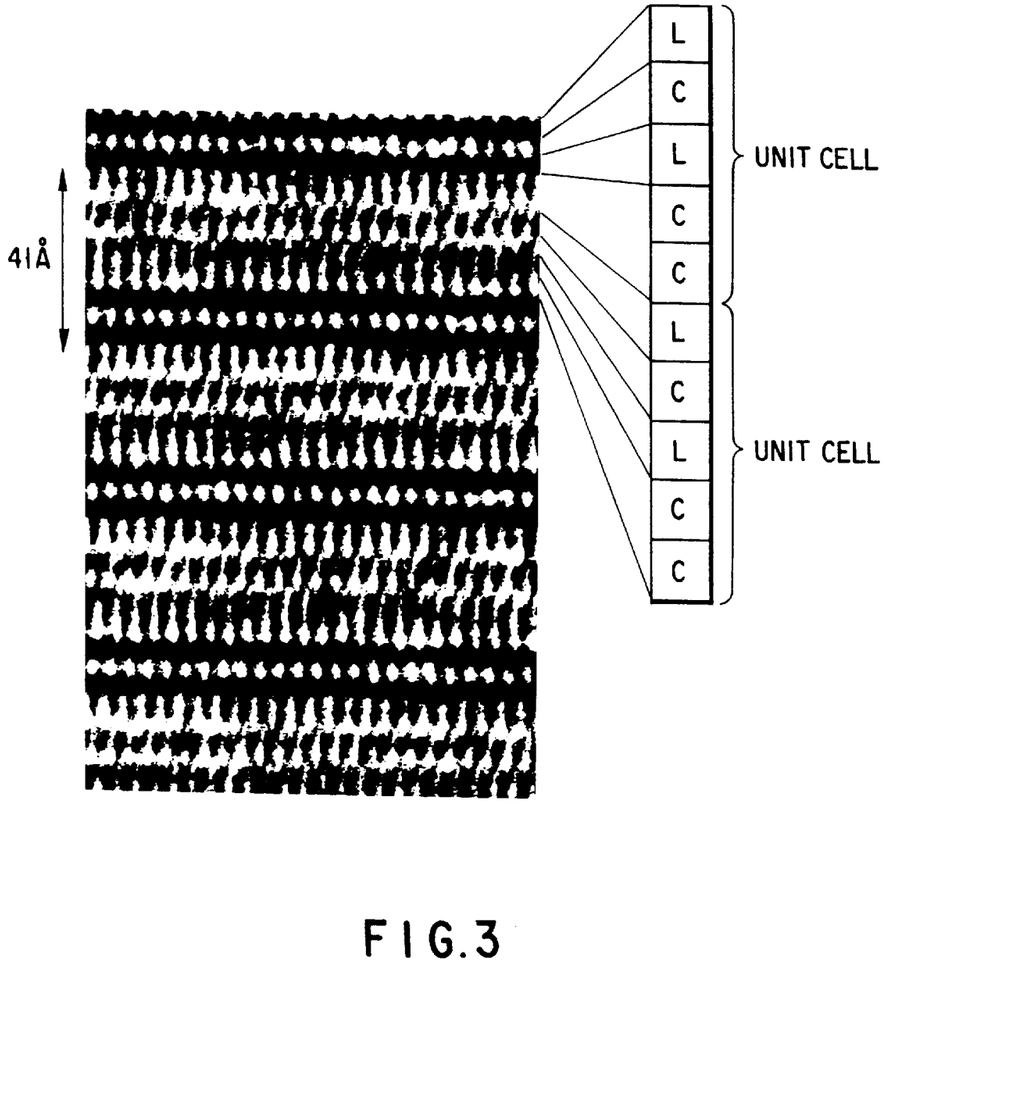
FIG. 3 is a microphotograph illustrating a transmission type electron microscopic image of the lattice of a hydrogen-absorbing alloy according in Example 1.

FIG. 3 shows a microphotograph of the lattice image which was observed at the most many measurement points in a hydrogen-absorbing alloy of Example 1 represented by a composition of $La_{10}M_4Ni_{46}$. The each layer represented in white in FIG. 3 is the $AB_5$ subcell "C", while the each layer represented in black is the $A_2B_4$ subcell "L". It will be seen from this FIG. 3 that the hydrogen-absorbing alloy of Example 1 comprises a crystal phase formed of unit cells, each unit cell having a laminate structure represented by (LCLCC).

On the other hand, with respect to the hydrogen-absorbing alloys of Comparative Examples 1 to 3, it was confirmed from the observation of the electron diffraction image and lattice image thereof by means of the TEM that a unit cell having a laminate structure represented by (LCLCC) was not existed in these alloys.

Further, it was found that the hydrogen-absorbing alloys of Comparative Examples 1 and 2 were both formed of a phase consisting of unit cells, each unit cell having a laminated structure represented by (LC). Therefore the alloy consisted of a phase having a $PuNi_3$ type crystal structure. In this case, the ratio in number of the $A_2B_4$ subcell to the $AB_5$ subcell in the unit cell, i.e. the ratio X (L/C) was found as being 1.0.

It was also found that the hydrogen-absorbing alloy of Comparative Example 3 was formed of a phase consisting of unit cells, each unit cell having a laminated structure represented by (LCC). Therefore the alloy consisted of a phase having a $Ce_2Ni_7$ type crystal structure. In this case, the ratio in number of the $A_2B_4$ subcell to the $AB_5$ subcell in the unit cell, i.e. the ratio X (L/C) was found as being 0.5.

The ratio X (L/C) in each unit cell of the crystal phase which was admitted in each of the alloys of Examples 1–5 and Comparative Examples 1–3 are also shown in Table 1.

The ratio of each crystal phase was also measured on each of hydrogen-absorbing alloys of Examples 1–5 and Comparative Examples 1–3, the results being shown in the following Table 1. This ratio was calculated by counting the ratio of the number of sample in which the aimed crystal structure was observed to the total number of sample (i.e. 20 pieces).

Figure 4:
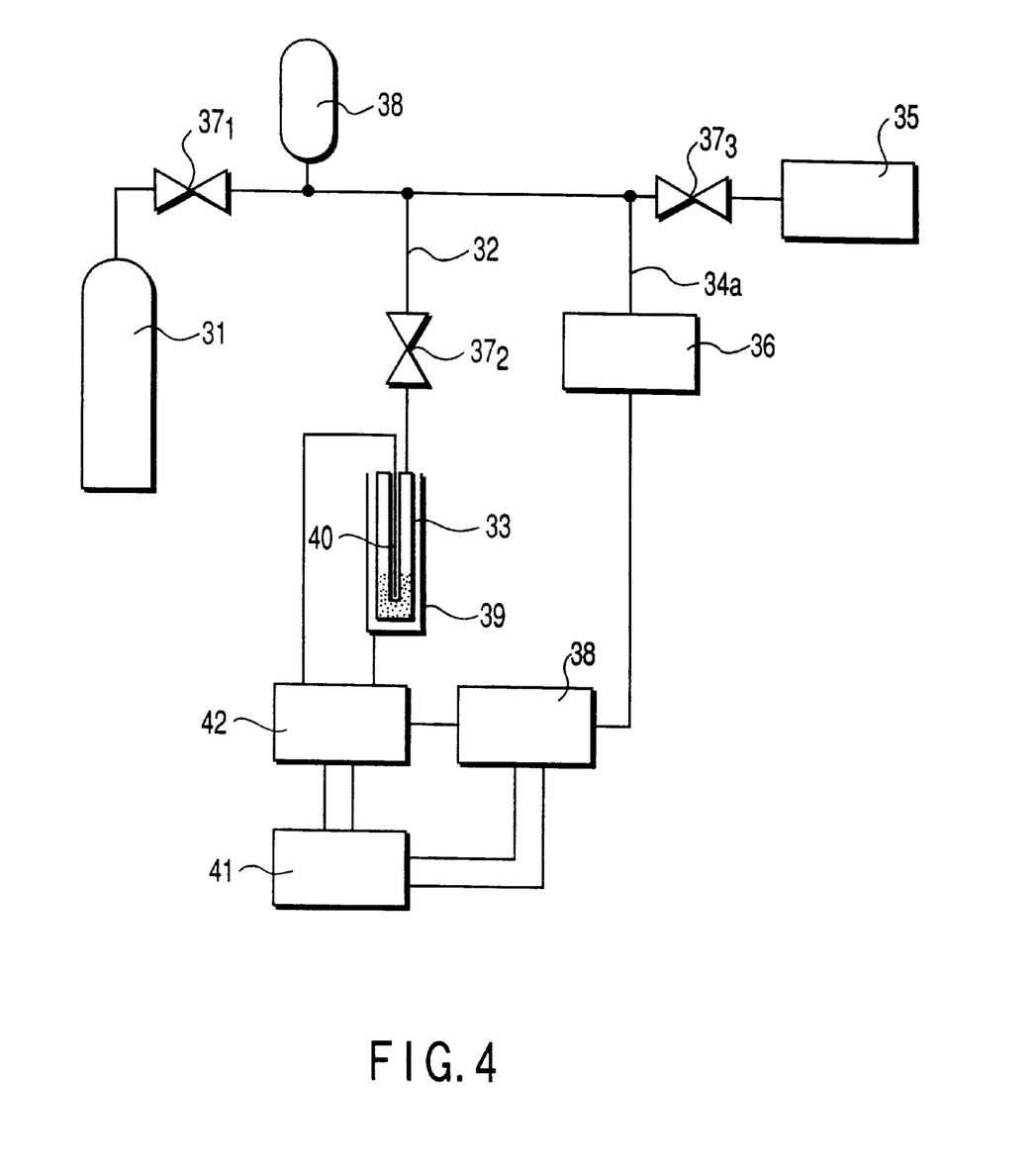
FIG. 4 is a schematical view of a temperature scanning type hydrogen absorption/desorption property-evaluating apparatus which was employed in the present Examples.

Then, by making use of a temperature scanning type hydrogen absorption/desorption property-evaluating apparatus shown in FIG. 4, each of hydrogen-absorbing alloys of Examples 1–5 and Comparative Examples 1–3 was measured with respect to the hydrogen absorption rate thereof.

FIG. 4 shows a schematic view illustrating this temperature scanning type hydrogen absorption/desorption property-evaluating apparatus which was employed in the evaluation of the hydrogen-absorbing alloys of these Examples and Comparative Examples. Referring to FIG. 4, a hydrogen gas cylinder 31 is connected via a pipe 32 to a test sample vessel 33. The middle portion of the pipe 32 is branched, and a distal end of the branched pipe 34 is connected to a vacuum pump 35. A manometer 36 is mounted on a pipe portion 34a branched from the branched pipe 34. On the pipe 32 interposed between the hydrogen gas cylinder 31 and the test sample vessel 33, there are mounted a first valve $37_1$ and a second valve $37_2$ in the mentioned order starting from the hydrogen gas cylinder 31. A pressure accumulator 38 is attached to a portion of the pipe 32 which is located between the first valve $37_1$ and the second valve $37_2$. Further, the vacuum pump 35 is connected via a third valve $37_3$ with the branched pipe 34a.

The test sample vessel 33 is provided with a heater 39. A thermocouple 40 is disposed inside the test sample vessel 33. A temperature controller 42 to be controlled by a computer 41 is connected to the thermocouple 40 as well as to the heater 39 so as to control the temperature of the heater 39 on the basis of a temperature detected from the thermocouple 40. A recorder 43 to be controlled by the computer 41 is connected to the manometer 36 as well as to the temperature controller 42.

Each of these hydrogen-absorbing alloys according to Examples 1–5 and Comparative Examples 1–3 was charged into the test sample vessel 33 (ambient temperature: −10° C.) shown in FIG. 4. Thereafter, the first valve $37_1$ was closed, and both of the second valve $37_2$ and the third valve $37_3$ were opened. Under this condition, the vacuum pump 35 was actuated to exhaust the air in each of the pipe 32, the branched pipe 34 and the pressure accumulator 38. Then, after the second valve $37_2$ and the third valve $37_3$ were closed, the first valve $37_1$ was opened to supply hydrogen from the hydrogen gas cylinder 31 to each of the pipe 32, the branched pipe 34 and the pressure accumulator 38 thereby carrying out a hydrogen displacement of them. Subsequently, the first valve $37_1$ was closed and at the same time, the quantity of hydrogen introduced was calculated from the pressures of the system indicated by the manometer 36. Thereafter, the second valve $37_2$ was opened thereby feeding hydrogen to the test sample vessel 33, and the temperature thereof was monitored with the thermocouple 40. Then, the temperature of the test sample vessel 33 was kept constant by controlling the computer 41 and the temperature controller 42. At the same time, a change in pressure if any within the test sample vessel 33 was detected by means of the manometer 36 and recorded in the recorder 43.

The quantity of hydrogen (H/M) that was absorbed in each of the hydrogen-absorbing alloys during a time period of half an hour after the introduction of a fixed amount of hydrogen into the test sample vessel 33 was calculated from the detection of the pressure change inside the test sample vessel 33, the results being shown as a hydrogen absorption rate (H/M h$^{-1}$) at a temperature of $-10°$ C. in the following Table 1.

Further, a test cell which was provided, as a negative electrode, with an electrode respectively containing of the hydrogen-absorbing alloys of Examples 1–5 and Comparative Examples 1–3 was assembled so as to measure the low temperature discharge property thereof.

First of all, the hydrogen-absorbing alloys of Examples 1–5 and Comparative Examples 1–3 were pulverized and sieved to prepare hydrogen absorbing alloy powder having a particle diameter of 75 $\mu$m or less. Then, an electrode was manufactured according to the following procedures. Namely, each hydrogen absorbing alloy powder was then mixed with electrolytic copper powder at a ratio of 1:1 (weight ratio), and 1 g of the resultant mixture was pressed for 3 minutes under a pressure of 5 tons/cm$^2$ by making use of a tablet molding machine (the inner diameter: 10 mm), thus obtaining pellets. These pellets were then sandwiched between Ni wire nettings, and the peripheral portion thereof was spot-welded. Subsequently, Ni lead wires were connected to the resultant body by means of spot-welding thereby preparing an electrode (a negative electrode).

Each of the negative electrodes thus obtained was dipped together with a counter electrode (sintered nickel electrode) into an aqueous solution of 8N-KOH (electrolyte), whereby assembling test cells.

The charge/discharge test was performed as follows. Namely, the test cell was subjected at first to a charging for 10 hours with a current of 100 mA per 1 g of the hydrogen-absorbing alloy, and, after being cooled down to 0° C., $-18°$ C. or $-23°$ C. during a 5-hour cessation, discharged with a current of 100 mA per 1 g of the hydrogen-absorbing alloy until the battery voltage (with respect to a mercury oxide reference electrode) was decreased down to $-0.6$V.

In this case, the discharge capacity at a temperature of 0° C. was assumed as being 1, and the discharge capacities at temperatures of $-18°$ C. and $-23°$ C. were compared with this value of discharge capacity at a temperature of 0° C., thus determining the retention ratio of capacity at temperatures of $-18°$ C. and $-23°$ C. The results are shown in the following Table 1.

As apparent from Table 1, the hydrogen-absorbing alloys according to Examples 1 to 5 were higher in hydrogen absorption rate as compared with the hydrogen-absorbing alloys of Comparative Examples 1 to 3.

Further, the secondary batteries of Examples 1 to 5 were higher in capacity retention ratio at low temperatures as compared with the hydrogen-absorbing alloys of Comparative Examples 1 to 3.

As explained above, the hydrogen-absorbing alloy according to this invention exhibits prominent effects such as a prominent improvement in hydrogen absorption and desorption rate while ensuring a high hydrogen absorption capacity. Therefore, the hydrogen-absorbing alloy of this invention is not only applicable to various fields of application to which the conventional hydrogen-absorbing alloys have been applied, such as the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, a temperature sensor, etc., but also applicable to the development of new fields of application utilizing a hydrogen-absorbing alloy.

Additionally, according to the electrode of this invention, it is possible to achieve prominent effects such as the retention of excellent discharge property even under low temperature conditions.

Furthermore, according to the secondary battery of this invention, it is possible to achieve prominent effects such as a high capacity and a long cycle life even under low temperature environments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A hydrogen-absorbing alloy comprising at least one crystal phase consisting essentially of at least one unit cell, said at least one unit cell having a structure formed by laminating a plurality of unit structures including at least one $A_2B_4$ unit structure and at least one $AB_5$ unit structure so as to share atoms present at a boundary of neighboring unit structures, and said at least one unit cell satisfying the following formula (1);

TABLE 1

| | Composition of alloy | Ratio of LCLCC crystal phase | Hydroge absorption rate (H/M · h$^{-1}$) | Capacity retention ratio ($-18°$ C.) | Capacity retention ratio ($-23°$ C.) |
|---|---|---|---|---|---|
| Ex. 1 | $La_{10}Mg_4Ni_{46}$ | 0.6 | 0.8 | 0.95 | 0.70 |
| Ex. 2 | $La_{10}Mg_4Ni_{48}$ | 0.4 | 0.7 | 0.91 | 0.62 |
| Ex. 3 | $Lm_{11}Mg_4Ni_{40}Co_6$ | 0.3 | 0.8 | 0.90 | 0.60 |
| Ex. 4 | $Lm_{10}Mg_4Ni_{38}Co_7Mn_2$ | 0.5 | 0.6 | 0.92 | 0.65 |
| Ex. 5 | $Lm_{10}Mg_4Ni_{36}Co_7Mn_2Al_3$ | 0.4 | 0.7 | 0.91 | 0.63 |
| Comp. Ex. 1 | $LaNi_3$ | 0 | 0.1 | 0.35 | 0.11 |
| Comp. Ex. 2 | $LaMg_2Ni_9$ | 0 | 0.2 | 0.37 | 0.15 |
| Comp. Ex. 3 | $La_2Ni_7$ | 0 | 0.1 | 0.41 | 0.15 |

$$0.5 < X < 1 \quad (1)$$

wherein A is at least one kind of element which is capable of generating heat of formation ΔH of less than 20 kJ/mol at the occasion of generating a hydride from one mole of hydrogen at a temperature of 25° C.; B is at least one kind of element which is capable of generating heat of formation ΔH of not less than 20 kJ/mol at the occasion of generating a hydride from one mole of hydrogen at a temperature of 25° C.; and X is a ratio in number of said at least one $A_2B_4$ unit structure to said at least one $AB_5$ unit structure.

2. The hydrogen-absorbing alloy according to claim 1, wherein said at least one $A_2B_4$ unit structure has a Laves structure, and said at least one $AB_5$ unit structure has a $CaCu_5$ type structure.

3. The hydrogen-absorbing alloy according to claim 1, wherein said at least one unit cell has a laminate structure represented by n(LCLCC), where L denotes the $A_2B_4$ unit structure, C denotes the $AB_5$ unit structure and n is a natural number.

4. The hydrogen-absorbing alloy according to claim 1, wherein said element A comprises Mg and at least one kind of element selected from the group consisting of rare earth elements including Y, and said element B comprises Ni.

5. The hydrogen-absorbing alloy according to claim 1, wherein a ratio of said at least one crystal phase in said alloy is 0.3 or more.

6. The hydrogen-absorbing alloy according to claim 1, which further comprises at least one kind of phase selected from the group consisting of a phase having $AB_2$ type crystal structure, a phase having $AB_3$ type crystal structure, a phase having $AB_{3.5}$ type crystal structure and a phase having $AB_5$ type crystal structure.

7. The hydrogen-absorbing alloy according to claim 1, wherein said at least one unit cell has a laminate structure represented by n(LCLCC), where L denotes the $A_2B_4$ unit structure, C denotes the $AB_5$ unit structure and n is a natural number, the $A_2B_4$ unit structure has a Laves structure, and the $AB_5$ has a $CaCu_5$ type structure.

8. The hydrogen-absorbing alloy according to claim 1, wherein the element A is at least one element selected from the group consisting of rare earth elements including Y; and Ca, Sr, Mg, Sc, Ti, Zr, V, Nb, Hf and Ta, and the element B is at least one element selected from the group consisting of Ni, Cr, Mn, Fe, Co, Cu, Zn, Sn, Si, B, Al and Ga.

9. An electrode comprising the hydrogen-absorbing alloy of claim 1.

10. The electrode according to claim 9, wherein said at least one $A_2B_4$ unit structure has a Laves structure, and said at least one $AB_5$ unit structure has a $CaCu_5$ type structure.

11. The electrode according to claim 9, wherein said at least one unit cell has a laminate structure represented by n(LCLCC), where L denotes the $A_2B_4$ unit structure, C denotes the $AB_5$ unit structure and n is a natural number.

12. The electrode according to claim 9, wherein said element A comprises Mg and at least one kind of element selected from the group consisting of rare earth elements including Y, and said element B comprises Ni.

13. The electrode according to claim 9, wherein a ratio of said at least one crystal phase in said alloy is 0.3 or more.

14. The electrode according to claim 9, wherein said hydrogen-absorbing alloy further comprises at least one kind of phase selected from the group consisting of a phase having $AB_2$ type crystal structure, a phase having $AB_3$ type crystal structure, a phase having $AB_{3.5}$ type crystal structure and a phase having $AB_5$ type crystal structure.

15. A secondary battery comprising a negative electrode, wherein said negative electrode comprises the hydrogen-absorbing alloy of claim 1.

16. The secondary battery of claim 15, further comprising a positive electrode and an alkaline electrolyte.

17. The secondary battery according to claim 16, wherein said at least one unit cell has a laminate structure represented by n(LCLCC), where L denotes the $A_2B_4$ unit structure, C denotes the $AB_5$ unit structure and n is a natural number, the $A_2B_4$ unit structure has a Laves structure, and the $AB_5$ unit structure has a $CaCu_5$ type structure.

18. The secondary battery according to claim 16, wherein the element A is at least one element selected from the group consisting of rare earth elements including Y; and Ca, Sr, Mg, Sc, Ti, Zr, V, Nb, Hf and Ta, and the element B is at least one element selected from the group consisting of Ni, Cr, Mn, Fe, Co, Cu, Zn, Sn, Si, B, Al and Ga.

19. The secondary battery according to claim 16, wherein said at least one $A_2B_4$ unit structure has a Laves structure, and said at least one $AB_5$ unit structure has a $CaCu_5$ type structure.

20. The secondary battery according to claim 16, wherein said at least one unit cell has a laminate structure represented by n(LCLCC), where L denotes the $A_2B_4$ unit structure, C denotes the $AB_5$ unit structure and n is a natural number.

21. The secondary battery according to claim 16, wherein said element A comprises Mg and at least one kind of element selected from the group consisting of rare earth elements including Y, and said element B comprises Ni.

22. The secondary battery according to claim 16, wherein a ratio of said at least one crystal phase in said alloy is 0.3 or more.

23. The secondary battery according to claim 16, wherein said hydrogen-absorbing alloy further comprises at least one kind of phase selected from the group consisting of a phase having $AB_2$ type crystal structure, a phase having $AB_3$ type crystal structure, a phase having $AB_{3.5}$ type crystal structure and a phase having $AB_5$ type crystal structure.

24. A hydrogen-absorbing alloy comprising at least one crystal phase consisting essentially of at least one unit cell which has a laminate structure comprising at least one $A_2B_4$ unit structure and at least one $AB_5$ unit structure, and said at least one unit cell satisfying the following formula (1);

$$0.5 < X < 1 \quad (1)$$

wherein A is at least one kind of element which is capable of generating heat of formation ΔH of less than 20 kJ/mol at the occasion of generating a hydride from one mole of hydrogen at a temperature of 25° C.; B is at least one kind of element which is capable of generating heat of formation ΔH of not less than 20 kJ/mol at the occasion of generating a hydride from one mole of hydrogen at a temperature of 25° C.; and X is a ratio in number of said at least one $A_2B_4$ unit structure to said at least one $AB_5$ unit structure, wherein said at least one unit cell has a laminate structure represented by n(LCLCC), where L denotes the $A_2B_4$ unit structure, C denotes the $AB_5$ unit structure and n is a natural number.

25. An electrode comprising the hydrogen-absorbing alloy of claim 24.

26. A secondary battery comprising a negative electrode, wherein said negative electrode comprises the hydrogen-absorbing alloy of claim 24.

27. A hydrogen-absorbing alloy comprising at least one crystal phase consisting essentially of at least one unit cell which has a laminate structure comprising at least one $A_2B_4$ unit structure and at least one AB$_5$ unit structure and said at least one unit cell satisfying the following formula (1);

$$0.5<X<1 \tag{1}$$

wherein A is at least one kind of element which is capable of generating heat of formation ΔH of less than 20 kJ/mol at the occasion of generating a hydride from one mole of hydrogen at a temperature of 25° C.; B is at least one kind of element which is capable of generating heat of formation ΔH of not less than 20 kJ/mol at the occasion of generating a hydride from one mole of hydrogen at a temperature of 25° C.; and X is a ratio in number of said at least one A$_2$B$_4$ unit structure to said at least one AB$_5$ unit structure, wherein said element A comprises Mg and at least one kind of element selected from the group consisting of rare earth elements including Y, and said element B comprises Ni.

28. An electrode comprising the hydrogen-absorbing alloy of claim 27.

29. A secondary battery comprising a negative electrode, wherein said negative electrode comprises the hydrogen-absorbing alloy of claim 27.

30. A hydrogen-absorbing alloy comprising at least one crystal phase consisting essentially of at least one unit cell which has a laminate structure comprising at least one A$_2$B$_4$ unit structure and at least one AB$_5$ unit structure said at least one unit cell satisfying the following formula (1);

$$0.5<X<1 \tag{1}$$

wherein A is at least one kind of element which is capable of generating heat of formation ΔH of less than 20 kJ/mol at the occasion of generating a hydride from one mole of hydrogen at a temperature of 25° C.; B is at least one kind of element which is capable of generating heat of formation ΔH (kJ/mol) of not less than 20 kJ/mol at the occasion of generating a hydride from one mole of hydrogen at a temperature of 25° C.; and X is a ratio in number of said at least one A$_2$B$_4$ unit structure to said at least one AB$_5$ unit structure, wherein a ratio of said at least one crystal phase in said alloy is 0.3 or more.

31. An electrode comprising the hydrogen-absorbing alloy of claim 30.

32. A secondary battery comprising a negative electrode, wherein said negative electrode comprises the hydrogen-absorbing alloy of claim 30.

33. A hydrogen-absorbing alloy comprising at least one crystal phase consisting essentially of at least one unit cell which has a laminate structure comprising at least one A$_2$B$_4$ unit structure and at least one AB$_5$ unit structure, and said at least one unit cell satisfying the following formula (1);

$$0.5<X<1 \tag{1}$$

wherein A is at least one kind of element which is capable of generating heat of formation ΔH of less than 20 kJ/mol at the occasion of generating a hydride from one mole of hydrogen at a temperature of 25° C.; B is at least one kind of element which is capable of generating heat of formation ΔH of not less than 20 kJ/mol at the occasion of generating a hydride from one mole of hydrogen at a temperature of 25° C.; and X is a ratio in number of said at least one A$_2$B$_4$ unit structure to said at least one AB$_5$ unit structure, wherein said at least on unit cell has a laminate structure represented by n(LCLCC), where L denotes the A$_2$B$_4$ unit structure, C denotes the AB$_5$ unit structure and n is a natural number, the A$_2$B$_4$ unit structure has a Laves structure, and the AB$_5$ unit structure has a CaCu$_5$ type structure.

34. An electrode comprising the hydrogen-absorbing alloy of claim 33.

35. A secondary battery comprising a negative electrode, wherein said negative electrode comprises the hydrogen-absorbing alloy of claim 33.

* * * * *